United States Patent [19]

Sipp et al.

[11] Patent Number: 5,026,082
[45] Date of Patent: Jun. 25, 1991

[54] STEP FOR TRANSPORT VEHICLE SIDE DOOR

[76] Inventors: Charles L. Sipp; Margaret M. Sipp, both of E. 24416 Joseph, Otis Orchards, Wash. 99027

[21] Appl. No.: 499,047

[22] Filed: Mar. 26, 1990

[51] Int. Cl.$^5$ .............................................. B60R 3/02
[52] U.S. Cl. .................................. 280/163; 280/166; 403/379; 411/343
[58] Field of Search ....................... 280/163, 166, 169; 403/324, 378, 379; 411/351, 340, 343, 344, 345; D12/203; 244/129.6

[56] References Cited

U.S. PATENT DOCUMENTS

| | | | |
|---|---|---|---|
| 196,914 | 11/1877 | Lockwood | 411/343 |
| 2,575,615 | 11/1951 | Crump | 280/166 |
| 3,329,443 | 7/1967 | Lowder et al. | 280/166 |
| 4,017,093 | 4/1977 | Stecker, Sr. | 280/163 |
| 4,159,122 | 6/1979 | Stevens | 280/166 |
| 4,930,797 | 6/1990 | Parrill | 280/166 |

FOREIGN PATENT DOCUMENTS 385772  9/1973  U.S.S.R. ............................... 280/166

Primary Examiner—Andres Kashnikow
Assistant Examiner—Eric Culbreth
Attorney, Agent, or Firm—Keith S. Bergman

[57] ABSTRACT

A removable step, carried by a highway transport vehicle laterally adjacent the threshold of a side door defined in a cargo container body, aids worker access through the door. The step provides fastening legs releasably maintained in spaced fastening brackets carried by the vehicle frame. The fastening legs are inserted in the upper portions of the fastening brackets in a use mode and in the lower portions of the fastening brackets, with the step extending inwardly, in a storage mode. A releasable fastening pin extends between each fastening leg and associated fastening bracket for positional maintenance of the step in either fastening or storage mode. The step surface is of a non-skid expanded metal type.

5 Claims, 1 Drawing Sheet

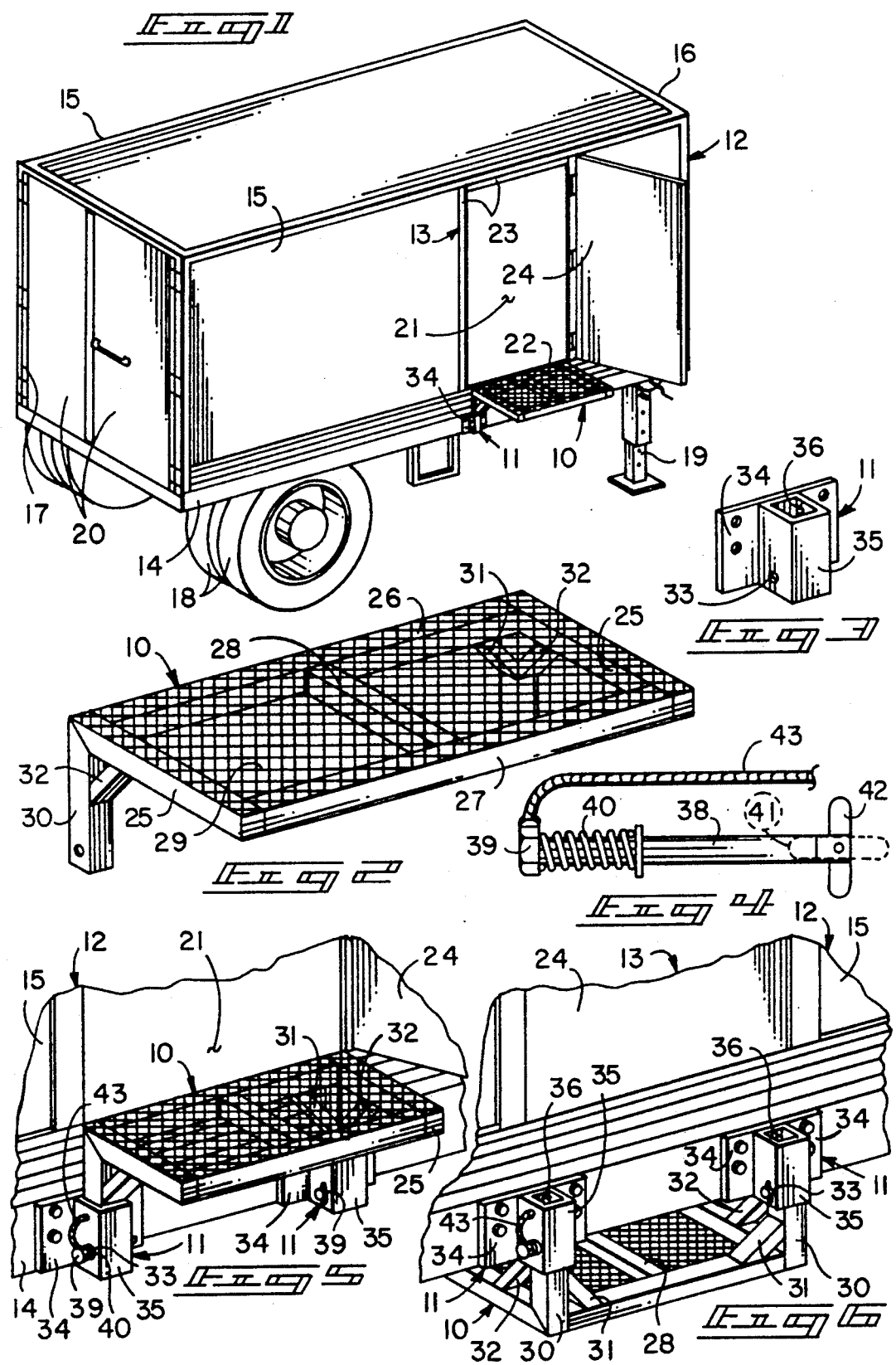

STEP FOR TRANSPORT VEHICLE SIDE DOOR

BACKGROUND OF INVENTION

1. Field of Invention

Our invention relates generally to steps for cargo transport vehicles, and more particularly to a step-type platform that is releasably placeable to aid access through the side door of such a vehicle and when not in use is stored on the vehicle.

2. Background and Description of the Prior Art

The highway transport of various cargo is carried out in trucks or trailers having a peripherally defined box-like containment space carried on a ladder-type frame with one or more depending wheel trucks to aid locomotion. Such vehicles, whether trucks and trailers, generally have doors in their rear end portions for access for loading and unloading. The configuration and dimensioning of such trucks and trailers has become reasonably standardized so that loading facilities may be constructed to accommodate almost any of such vehicles to effectuate loading and unloading operations through the rear doors.

Many such vehicles of the modern day, however, are also provided with side access doors. This is especially true in vehicles intended for short distance hauls such as for local deliveries of goods and vehicles that are subdivided into two or more separated chambers for containment of particular goods, especially such goods as must be maintained under different environmental conditions. These latter vehicles must generally be both loaded and unloaded through side doors. Since most trucks and trailers are generally formed with a ladder-type frame that supports a cargo containment body and that containment body is maintained at a distance of approximately four feet above a supporting surface to provide for proper locomotion, access to such side doors has heretofore presented problems. Our invention seeks to solve these problems.

Though most loading docks have decks of substantially the proper height for ingress and egress to the side doors of a trailer, since those doors are usually of the same height as rear doors, nonetheless those dock facilities are generally designed for trailer positioning with the rear of a vehicle adjacent the dock for access to the rear doors. Commonly neither a trailer nor truck can be appropriately positioned relative to such dock structures to allow access to side doors, or at least to conveniently do so. Additionally in local delivery work, and generally in work with cargo containment spaces that are subdivided, access must often be had in locations where there are no dock structures. This problem of side door access is exacerbated when the space being accessed through the side door is a freezer compartment, as in this case any structures adjacent the door often become cold to condense atmospheric moisture and freeze it to ice which slickens adjacent surfaces and makes access thereover hazardous to workers.

In the past where problems of such side door access have been recognized and dealt with at all, generally vertically oriented ladder-like step structures have been provided depending from a truck frame vertically below or adjacently below a side door. These ladder-like devices, however, have not proven particularly satisfactory for access as they provide support for a worker's foot only spacedly below the door opening and not at the level of a door threshold. Such step structures also generally have been of limited width to aid access only at a particular portion of the door opening or adjacent to it, which often is not appropriate to aid loading or unloading of merchandise through a door. The vertical extent of such step structures is also limited as they generally have been fastened to a vehicle in a rigid immovable fashion and by reason of this, the step structure cannot depend downwardly too closely to a surface supporting the vehicle or the step structure may come into contact with irregularities in a supporting surface to cause damage to the step structure or possibly even to a vehicle.

Our invention resolves this problem by providing a releasably positionable step structure that has a horizontal surface of substantial areal extent at the level of and immediately adjacent a threshold of a vehicle side door. The step structure provides a planar step with perpendicularly depending spaced legs releasably carried in vertically oriented channels defined in fastening brackets supported by the vehicle frame below the cargo containment member defining a side door to be serviced. The step is releasably maintained in operative mode by pin-type fasteners extending through appropriately positioned holes defined in associated fastening brackets and step legs.

The problems of frozen surfaces on such a step that is associated with a refrigerated cargo compartment is alleviated by providing a horizontal step surface formed of expanded metal firstly, to provide a roughened surface with projections and orifices that tend to prevent slipping and secondly, to provide a surface that does not uniformly or well transmit heat so that freezing is lessened in general and if there be any freezing, it occurs in discrete spaced areas of the stepped surface rather than uniformly over the entire step surface.

With a step such as ours, it is necessary that it project laterally outwardly from the side of the trailer to properly serve its purpose of supporting a user during ingress and egress for loading and unload. Such a step structure would necessarily cause operative problems for a trailer being serviced if it were to remain in operative position during vehicle transport. By reason of this, our step must be releasably positionable so that it may be removed during periods of non-use. Our mounting system provides simple and easy means for step removal and also for positional maintenance of a step in a storage mode during periods of non-use.

To accomplish step storage, we provide a fastening system with fastening brackets, carried on the side of the trailer frame, that have channels defined vertically through the brackets. A step may be stored in such brackets by turning it with its fastening legs extending upwardly and its horizontal step portion extending inwardly under the vehicle frame, moving the legs upwardly into the support brackets from below, and inserting releasable fastening pins in cooperating holes defined in both brackets and step legs to extend between the elements in a releasable fastening relationship. The step is thusly stored in a convenient, out of the way position during periods of non-use, but it remains readily available whenever desired.

In some vehicles a wheel truck structure may be located immediately beneath a side door defined in the cargo containment chamber to prevent storage of our step in the same brackets which support it in its operative mode outwardly adjacent a side door. If this construction be present, a second set of fastening brackets may be established spaced forwardly or rearwardly from the side door for step storage in a position where it will not interfere with any wheel truck structures of the vehicle. In some vehicles, two or more spacedly separated side doors are defined and in this instance, one step structure might conveniently be used with all such side doors. Ordinarily if there be multiple side doors, at least one such door will be in a position where the step structure may be stored in the normal fastening brackets associated with that particular door.

It is to be noted that our step may serve an additional function of maintaining a side door of a trailer or truck in open condition when the step is operatively positioned in its use mode. Normally a side door of a cartage vehicle extends somewhat below the upper surface of the threshold of the door opening closed thereby. By reason of this, when our step structure is operatively positioned at an elevation substantially the same as the door threshold, the door associated with that door opening may not be moved over our step structure. The door will have to be open before the step structure can be operatively placed and the step structure will thereafter prevent the door from closing accidentally during use of our step, to aid in preventing damage to the door structure itself or to a workman by reason of accidental closure.

Our invention resides not in any one of the foregoing features per se, but rather in the synergistic combination of all of its structures that combine to provide the functions necessarily flowing therefrom.

SUMMARY OF INVENTION

Our invention generally provides a releasably positionable step with associated fastening system for use to aid access through a side door of a cargo container of a highway transport vehicle of either the truck or trailer type.

Our step provides a flat, horizontal support surface of generally rectilinear configuration and some areal extent having perpendicularly depending fastening legs at two adjacent corners. The support surface is formed of expanded metal configured with some upturned portions to provide substantial traction for support of a user.

Our fastening system comprises spaced fastening brackets carried by the side of a vehicle frame, each bracket defining a substantially vertically disposed channel extending therethrough to slidably receive a fastening leg of the step. The fastening brackets are positioned beneath a door structure to be serviced to receive fastening legs from above and maintain the step surface substantially at the level of the associated door threshold. The step is maintained in the fastening brackets by releasably positionable pins extending in appropriately defined holes through the bracket and supported fastening leg. The brackets in a storage mode carry the fastening legs extending upwardly from beneath the bracket and the horizontal surface of the step extending under a vehicle frame. If the step may not be stored in the brackets associated with a particular side door by reason of adjacent wheel truck structure or otherwise, an additional set of fastening brackets is established on the trailer frame to provide appropriate storage for the step.

In providing such a device, it is:

A principal object of our invention to create a step of some substantial horizontal area that is releasably positionable to extend laterally outwardly from the threshold of a side door of a cargo compartment of a highway transport vehicle.

A further object of our invention is to provide such a step that has two spaced, perpendicularly extending fastening legs at one side edge for releasable carriage in channels defined in paired opposed fastening brackets structurally carried by the side of a vehicle frame, with the step extending laterally outwardly in a supportive fashion when positioned in the brackets from above and positionable in an inwardly extending storage mode when positioned in the brackets from beneath.

It is a further object of our invention to provide such a step and fastening structure that has releasably fastenable pins extending in appropriately defined holes through the fastening brackets and associated fastening legs to releasably maintain positioning of the step in either of its modes.

A still further object of our invention is to provide such apparatus that is of new and novel design, of rugged and durable nature, of simple and economic manufacture and otherwise well suited to the uses and purposes for which it is intended.

Other and further objects of our invention will appear from the following specification and accompanying drawings which form a part hereof. In carrying out the objects of our invention, however, it is to be understood that its essential features are susceptible of change in design and structural arrangement with only one preferred and practical embodiment being described and illustrated as is required.

BRIEF DESCRIPTION OF DRAWINGS

In the accompanying drawings which form a part hereof and wherein like numbers of reference refer to similar parts throughout:

FIG. 1 is an isometric side view of a typical over-the-road transport trailer having a side door structure and showing our invention in place for access to the door structure.

FIG. 2 is an isometric surface view of our step showing its various parts, their configuration and relationship.

FIG. 3 is a partial orthographic view of one of the fastening brackets of our invention.

FIG. 4 is a somewhat enlarged isometric view of one of the fastening pins that extend between a fastening bracket and a supported fastening leg to releasably fasten the two elements relative to each other.

FIG. 5 is an isometric view of our step mounted on the side frame of a trailer in its operative mode above the fastening brackets.

FIG. 6 is an isometric view of the same structure as FIG. 5 showing the step mounted beneath the fastening brackets to effectuate its storage mode.

DESCRIPTION OF THE PREFERRED EMBODIMENT

Our invention generally provides step 10 releasably positionable in fastening brackets 11 carried by transport vehicle 12 adjacent side door structure 13 to aid worker ingress and egress through the side door.

Our invention is usable with over-the-road transport vehicles of either the trailer type, which are pulled by some releasably attachable tractor, or of the truck type, which provide their own integral means of propulsion. Either such vehicle in general provides a ladder type frame generally having spaced elongate side beams 14 interconnected by appropriate cross beams to support a peripherally defined box-like cargo container having similar sides 15, front end 16, and rear end 17. The vehicular frame is supported by at least one wheel truck 18 in its rearward portion in some trailers, and by multiple wheel trucks in other trailers and all trucks. Trailers having only a single rearwardly positioned wheel truck commonly provide some forward support structure 19 which is movable from the depending supportive position illustrated in FIG. 1 to an upward storage position when the trailer is being supported by a tractor (not illustrated). Commonly such truck or trailer vehicles provide rear door structures 20 defined in rear end 17 of a vehicle to provide primary access for loading and unloading operations. Trailer structures provide various means for interconnection with releasably interconnectable tractor units, the most common of which is the so-called "fifth wheel" structure used by many such vehicles in the modern day.

The configuration and dimensioning of both trailer and truck structures are commonly regulated by various sovereigns having jurisdiction over highway systems to be transversed by the vehicles and largely by reason of this such parameters have become reasonably standardized. The height of the vehicle frame, and particularly its side beams 14, is generally approximately four feet above a supporting surface, and the height of the cargo container structure, though somewhat variable, is generally sufficient to allow an average sized worker to assume a standing posture within the peripheral walls defining the container structure.

Our invention is adapted for use on such cargo transport vehicles that define at least one side door structure 13. Such side door structures traditionally include door opening 21 defined in a cargo carrier side wall and having threshold 22 and frame 23 closable by movably mounted door 24. Commonly the upper surface of threshold 22 will be at or slightly above the upper portion of side beam 14, and door 24 will have a vertical dimension such as to allow ingress and egress of a standing worker of ordinary height and a width of some three to four feet to allow ease of access of both workers and cargo therethrough.

One or more such door structures may be defined in any portion of container sides 15, but commonly a door structure will be defined on one side only and in a forward position. The reasons for such side doors vary. Often side doors are provided merely to allow better access to a particular portion of a substantial mass of cargo contained in a particular container structure. In some container structures, the containment space is divided into plural compartments and if this be done, commonly side doors are required to provide appropriate access to some of such compartmental spaces. One common reason for providing divided space within a container structure is to allow the existence of different environmental conditions in different spaces, such as to provide normal ambient atmospheric conditions in one chamber and a refrigerated environment, either above or below freezing, in one or more other chambers. Whatever the reason, one or more side door structures in trucks and trailers used for highway transport of cargo are relatively common, and it is with such structures that our invention is concerned.

Our step 10 provides a flat peripheral frame formed by similar ends 25, inner side 26 and outer side 27 all structurally joined to form a unitary frame structure. The step illustrated is of normal size and traditional rectilinear shape to provide a step structure of a configuration with which a potential user is habitually familiar to aid in preventing accidents. It commonly is desirable to provide at least one medial cross support 28 in the peripheral frame, in the instance illustrated extending parallel to ends 25 and between sides 26 and 27. The upper surface of this medial cross support is coplanar with the upper surface of the frame.

The upper surface of the peripheral frame is covered by structurally joined step element 29, peripherally formed of expanded metal. This step element may be formed of other material having a planar configuration that is of appropriate strength and rigidity, but expanded metal such as is produced in present day commerce specifically for steps is preferred as it provides more utility at low cost. This expanded metal generally defines a plurality defining spaced orifices with a part of the peripheral edge of each orifice upturned somewhat to provide a surface with some upwardly extending protuberances which aid in maintaining traction on the surface. The orifices in the expanded metal also aid in providing debris free areas and in allowing smaller loose debris that may come to rest or be accumulated on the step surface to pass therethrough. Such expanded metal is readily available in commerce and preferably is attached to a metallic type peripheral frame by welding, though other means of mechanical fastening heretofore known in the metal fabrication arts, such as riveting, bolting or the like, may be used.

Opposed ends of inner side 26 of the frame each support fastening legs 30 structurally interconnected with the peripheral frame to extend perpendicularly from the side of the frame opposite that which supports the step element. These fastening legs are provided with similar angularly extending braces 31 communicating from a leg to the inner side of the peripheral frame spacedly adjacent the interconnection of the frame with that fastening leg to provide additional strength and rigidity. Similar angled braces 32 are provided for each leg to extend in an angulated fashion back to each adjacent end 25 of the peripheral frame. The positioning of these angled braces on the fastening legs is somewhat critical in that the positioning cannot prevent the containment of the fastening legs in associated fastening brackets and at the same time the braces preferably provide a limitation of the distance that the fastening legs may be inserted into the fastening brackets, as hereinafter described.

Preferably the peripheral frame, fastening legs and angled braces are all formed of extruded metal channel elements, as illustrated in the drawings, though undoubtedly other elongate structural elements of different cross-sectional shape but appropriate strength and rigidity might be used for the purpose. If metal elements are used, preferably the various metal elements that are structurally joined to each other are joined by welding to provide a structure of appropriate rigidity, durability and strength.

The size of step 10 is not critical to our invention, but normally the length of inner side 26 and outer side 27 will be either the same or slightly less than the length of the threshold of a door to be serviced by the step. The lateral extension of the step, that is the length of ends 25, should be about ten inches to provide a width with which an ordinary user is habitually familiar in other steps, and it should not be too much greater than twelve or thirteen inches so as to create too great a force on its various elements by reason of the cantilever nature of the step support, keeping in mind that the step may be used by workers supporting substantial weights of cargo.

Fastening structure 11 comprises two similar brackets spacedly carried on side beam 14 of a transport vehicle to releasably receive and support fastening legs 30 of our step. Each bracket provides fastening plate 34 of a configuration to be fastenable upon the outer or lateral surface of side beam 14. The fastening plate 34 carries in its medial portion vertically extending elongate fastening tube 35 defining medial fastening channel 36 extending therethrough. The cross-sectional shape of fastening channel 36 is similar to the cross-sectional shape of fastening legs 30 so that those legs may be slidably received within fastening channels 36. The length of fastening legs 30 below their intercommunication with angled braces 31, 32 is such as to allow the fastening legs to extend into a fastening channel 36 for appropriate support of the step. Generally the vertical dimension of the fastening channel is substantially the same as that of side beam 14, which commonly is about six inches, and in such case it is desirable that the fastening leg extend into the channel a distance of several inches.

Fastening tube 35 defines opposed cooperating fastener holes 33 extending therethrough in a direction perpendicular to the axis of fastening channel 36 to receive a pin-type fastener to releasably fasten and maintain a step fastening leg within an associated fastening channel. Similar cooperating fastening holes 33 are defined in each fastening leg. A single set of fastening holes 33 may be used to maintain our step in either operative or storage mode, if such holes are appropriately positioned, but it may be desirable to define separate sets of fastening holes for each mode. If so desired and though not illustrated, this modification is within the ambit of our invention.

A preferred type of fastening pin for use with our fastening structure is illustrated in FIG. 4. The fastening pin has elongate body 38 with cross-sectionally larger head 39 at one end and cylindrical compression spring 40 carried about a portion of the body 38 adjacent its communication with the head. The outer end portion of body 38, distal from the head 39, defines medial, axially extending slot 41 wherein elongate fastening dog 42 is carried for pivotal motion from a non-fastening mode within the slot to a fastening mode extending perpendicularly to the slot. Preferably one end of flexible cable 43 is attached to the fastening pin and the other end is attached to the fastening structure to allow appropriate use of the fastening pin but yet avoid its separation and possible loss from the fastening structure. The dimensioning of the fastening pin is so regulated that when the pin is inserted through holes defined in the tubular fastening element and the fastening dog extended to a fastening position, there will be some tension in compression spring 40 to maintain the fastened condition, but yet allow unfastening by appropriate manual manipulation.

Having thusly described the structure of our invention, its use and operation may be understood.

To install our invention for use upon a transport vehicle, it is necessary to structurally interconnect two fastening plates 34 on a vehicle frame side beam 14 below side door opening 21 of the vehicle in question. The fastening plates are spacedly positioned relative to each other so that a cooperating pair of fastening tubes carried thereby will slidably receive the fastening legs 30 of a step to be supported. The fastening plates are vertically positioned relative to side beam 14 of a vehicle so that when the fastening legs 30 of the associated step are carried in the opposed fastening tubes and the angled braces of the fastening legs are at the upper edge of the fastening channels, step element 27 will be substantially at the level of the threshold of side door structure 13 to be serviced.

These positions may be readily determined on a side beam by fastening the opposed fastening structures on the fastening legs of a step element by means of the fastening pins extending therebetween, locating the entire structure in proper position, and then marking the position of the fastening plates 34 on the side beams 14. The fastening plates are then structurally fastened to the side beams in appropriate marked positions by welding or fastening devices such as bolts, rivets or the like.

To use the step once the fastening plates are established, side door 21 is opened and step element 10 is manually manipulated to insert its fastening legs 30, from above, into the paired opposed fastening tubes 35 carried by the fastening plates and with its step extending laterally outwardly. When this has been accomplished, the step element will be structurally maintained in appropriate operative position against downwardly directed forces merely by reason of the association of the structures involved. To assure positional maintenance of the step in the operative position, fastening pins are inserted in the appropriate fastening pin holes so that the fastening pins extend between the fastening channel and the associated fastening leg carried in the channel. After insertion of a fastening pin, fastening dog 42 is manually moved into fastening position to positionally maintain the operative mode.

When it is desired to cease use of our step and store it in an inoperative mode, the operation as described for step establishment is reversed. Fastening dogs 42 of the fastening pins are manually manipulated to move them to a releasable position within slots 41 and the pins are removed from the tubular fastening elements through which they extended to release the fastening legs of the step from interconnection with the associated fastening brackets. The step is then manually manipulated to move it vertically upwardly and remove it from the fastening brackets. The step then is turned with its fastening legs extending upwardly and its peripheral frame and step element extending horizontally inwardly beneath the side beam 14. In this position, the fastening legs of the step are inserted in the lower portions of associated fastening tubes 35 and after insertion, the fastening legs are again releasably fastened in this position by inserting fastening pins in the holes defined through the elements. The fastening pins are then releasably fastened in this position by pivoting fastening dogs 42 and the step is releasably maintained in a stored mode to await future use.

If the particular trailer involved is one in which the step structure cannot be stored in fastening brackets servicing a particular side door, the step is stored in similar fashion to that described in other fastening brackets that are provided in a position where the step may be stored (not shown). It should be noted that commonly if a trailer has two side doors, one step structure ordinarily may be positioned to serve both doors, and in this case the step structure may be stored in the fastening brackets that position the step structure so that it does not interfere with any wheel truck structures.

The foregoing description of our invention is necessarily of a detailed nature so that a specific embodiment of it might be set forth as required, but it is to be understood that various modifications of detail, rearrangement and multiplication of parts might be resorted to without departing from its spirit essence or scope.

Having thusly described our invention, what we desire to protect by Letters Patent and

What we claim is:

1. A releasably positionable step and fastening structure, to aid access to a side door of a transport vehicle having a frame with side beams supported for locomotion by at least one wheel truck, said frame supporting a cargo container defining said side door for access, comprising in combination:

a step, having a peripheral frame with a linear inner edge, said frame having first and second surfaces and supporting a rigid step element on its first surface and structurally carrying two configurationally similar depending fastening legs on its second surface at opposed ends of the inner edge of the frame, each fastening leg extending substantially perpendicularly a spaced distance from the peripheral frame and having angled braces structurally communicating from a medial portion of each fastening leg to the peripheral frame;

fastening structure comprising two configurationally similar fastening plates, each having a vertically extending fastening tube defining an internal channel to slidably receive one aforesaid fastening leg of the step, each said fastening plate structurally carried on a side beam of the transport vehicle frame beneath the side door defined therein and in spaced relationship to receive the fastening legs of the step; and releasable fastening means for maintaining the fastening legs of the step within the channels defined by the fastening tubes.

2. The step of claim 1 having the step element formed of expanded metal defining plural voids and having means to aid non-slipping contact therewith.

3. The invention of claim 1 further characterized by the means of fastening the step fastening legs in the channels of the fastening tubes comprising:

fastening pins extending through cooperating holes defined in the step fastening leg and associated fastening tube, each said fastening pin having an elongate body with a head at one end and a compression spring about the elongate body adjacent said head, with a slot in the end of the body distal from the head, said slot having a pivotally interconnected fastening dog carried in the slot for motion from a position within said slot to a fastening position extending perpendicularly therefrom, the distance between the compression spring and the fastening dog when in fastening position being less than the distance between the outer surfaces of the fastening holes defined in the fastening tubes.

4. The device of claim 3 further characterized by:

the fastening legs of the step being carried within the internal channels of the fastening tubes with the step element being below the fastening brackets, extending inwardly beneath the side beam carrying the fastening brackets and the fastening legs being releasably maintained in the fastening brackets by the said fastening pins.

5. The device of claim 1 further characterized by:

the fastening legs of the step being carried within the internal channels of the fastening tubes with the step element being above the fastening brackets.

* * * * *